United States Patent
Hoffman

(10) Patent No.: US 6,823,759 B2
(45) Date of Patent: Nov. 30, 2004

(54) METHOD AND APPARATUS FOR STRENGTHENING AND LEVELING A SAW BLADE

(75) Inventor: Steve E. Hoffman, Englewood Cliffs, NJ (US)

(73) Assignee: Mikronite Technologies Group, Inc., Carlstadt, NJ (US)

( * ) Notice: Subject to any disclaimer, the term of this patent is extended or adjusted under 35 U.S.C. 154(b) by 0 days.

(21) Appl. No.: 10/292,062

(22) Filed: Nov. 12, 2002

(65) Prior Publication Data

US 2003/0094077 A1 May 22, 2003

Related U.S. Application Data

(60) Provisional application No. 60/331,826, filed on Nov. 19, 2001.

(51) Int. Cl.⁷ ............................................... B23D 63/18
(52) U.S. Cl. ........................................... 76/27; 76/25.1
(58) Field of Search ........................... 76/25.1, 26, 27; 72/176, 226

(56) References Cited

U.S. PATENT DOCUMENTS

| | | | |
|---|---|---|---|
| 450,178 A | * 4/1891 | Mortorff | 76/27 |
| 510,210 A | * 12/1893 | Toomer | 76/27 |
| 1,058,856 A | * 4/1913 | Gibbs | 72/75 |
| 1,155,966 A | * 10/1915 | Stone | 76/27 |
| 4,325,272 A | 4/1982 | Kelsey | |
| 4,875,393 A | 10/1989 | Williams | |
| 5,269,205 A | 12/1993 | Oppliger | |
| 5,522,283 A | 6/1996 | Brown | |
| 5,775,181 A | 7/1998 | Carlsen et al. | |
| 5,946,985 A | 9/1999 | Carlsen et al. | |
| RE36,409 E | 11/1999 | Brown | |
| 6,067,879 A | * 5/2000 | Rautio et al. | 76/25.1 |

OTHER PUBLICATIONS

Tools of the Trade, David Frane, *Thin and Thinner,* Summer 1998, www.toolsofthetrade.net/content/tools/1998/summer/thin/default.asp.

* cited by examiner

Primary Examiner—Hwei-Siu Payer
(74) Attorney, Agent, or Firm—Drinker Biddle & Reath LLP

(57) ABSTRACT

An apparatus for leveling and strengthening a rim of a saw blade is disclosed which includes a rotatable support for holding a saw blade, a first arm with a contact bearing for contacting a first face of a saw blade mounted in the support, and a second arm with a contact bearing for contacting the opposite face of the saw blade. The device also includes means for positioning the first and second contact bearings with respect to the saw blade support. In one embodiment the device the means for positioning includes a lateral adjustment mechanism attached to the first and second arms which varies the lateral spacing with respect to one another of the ends of the arms. A method for leveling and strengthening a rim of a saw blade is also disclosed.

22 Claims, 5 Drawing Sheets

METHOD AND APPARATUS FOR STRENGTHENING AND LEVELING A SAW BLADE

RELATED APPLICATION

This application is related to and claims priority from U.S. Provisional Patent Application Ser. No. 60/331,826, filed Nov. 19, 2001. That provisional application is incorporated herein by reference in its entirety.

FIELD OF THE INVENTION

The present invention relates to a saw blades and, in particular, to a method and apparatus for strengthening and leveling circular saw blades.

BACKGROUND OF THE INVENTION

It is very important that a saw blade be designed not to deform when operating under normal conditions. For a circular saw blade normal operating conditions involve high circular speeds and high loads imposed during cutting. When a circular saw operates at the high rate of rotation necessary to cut wood, metal and other materials, there is a tendency for the outer edges of conventional blades to deviate from the cutting line, either to one side or the other, or to both sides, producing a wavy cut. The wobbling of the cutting edge can also urge the saw edge to continue its cut to one side or the other of the intended line. The nature of the circular saw then tends to continue to lead the blade in that direction.

This uneven cutting is a result of invisible defects in the saw blade, such as minute surface deformities and improper distribution of residual tension stresses in the blade. The centrifugal force, which results from high blade rotational speeds, induces substantial tension stress in the blade. This tension is superimposed on any residual stresses in the blade, such that the resulting non-uniformity of tension produces uneven strain. Any irregularities in the blade surface also interfere with true running, as the tension changes when the blade approaches its cutting speed. Thus, a blade may be weakened or deflected from a true course by either of these types of defects.

Areas on the surface of a blade wherein residual tension stresses vary significantly from the normal tension level commonly referred to as "tight" or "loose" spots. Surface deformities include convex and concave deviations from a flat plane, including bulges, ridges, kinks, etc. Consequently, a critical part of the maintenance of circular saws is removing these dents or bends, i.e., leveling. Also, it is quite common to tune the saw blade to operate at typical rotational speeds by stretching the blade in specifically determined locations to cause tension at the periphery of the saw plate, i.e., tensioning. Leveling and tensioning operations have typically been done manually using various devices, such as hammers, anvils and gauges. Several equipment manufacturers build "stretcher rolls" which assist in such manual tensioning and leveling of saw blades. A typical circular saw blade is stamped from sheet metal with a punch press. This sheet metal is usually low-carbon steel with a Rockwell hardness rating of approximately Rc 22 (diamonds have an Rc rating of about 100). In the cutting tool industry, materials with an Rc rating of 22 are considered relatively soft, generally acceptable for consumer-grade blades but not rigid enough for professional use.

Several solutions for creating harder and more level saw blades have developed in the art. One solution is to harden the blade after it is cut. Another is to punch press the blade from the hardest steel the dies can handle. The capabilities of the punch limit the type and hardness of the steel that can be used. Either way, the maximum hardness of a low-carbon blade will be around Rc 29.

An alternate means for hardening a circular saw blade is to use a high carbon steel that generally has a hardness of around Rc 40–45. However, the hardness of this material inhibits the use of a punch press. Instead, alternate cutting procedures must be used, such as through the use of lasers. Laser-cut blades cost more than die-cut blades, due in part to the increased time involved in cutting the blade and the need for more expensive laser cutting machinery. On the other hand, a laser makes it easier (and cheaper) to produce small runs of specialized blades because a manufacturer does not have to purchase expensive dies.

Another conventional approach to hardening a circular saw blade is by tensioning. The plate of a top-quality blade is tensioned to increase its strength and prevent it from vibrating at high speeds. The idea behind tensioning is that the metal is compressed in one part of the plate. The compression dampens the blade's natural tendency to vibrate at high speed, essentially changing the natural frequency of the material. Since the outer edges of blades can spin as fast as 12,000 surface feet per minute, the goal is to stiffen the blade such that it does not vibrate at this anticipated speed. Tensioning is an important feature for blades intended to produce fine-finish cuts. Tensioning is especially important for thin blades which are more prone to bending and vibrating during cutting.

One method used in the past by manufacturers to tension blades was by carefully striking certain parts of the plate with a hammer. The sawsmith was the skilled toolmaker who performed this manual tensioning. Due to the high precision necessary and time consuming labor involved, the blades produced by a sawsmith were more expensive than their mass produced counterparts. Today, most toolmakers tension a blade by running the rim between a pair of wheels as shown in RE 36,409 to Brown. This is known as rim tensioning.

FIG. 1 illustrates a convention rim tensioning system As shown, wheels W are used to stiffen the circumferential rim surface by squeezing a small segment of the blade B as the blade rotates on shafts S. One problem with conventional tensioning is that, as the wheels turn and compress the material, they produce heat in the blade that causes the material to crawl out of true level (i.e., out of plane). At best, conventional rim tensioning systems using wheels achieve only about a 0.004 inch planar tolerance of the blades. Another drawback of conventional rim tensioning machines is that because of the size of the wheels, the tensioning is typically performed two inches from the outer edge and is located at a set radial position on the blade.

A need, therefore, exists for a device that provides quick and accurate tensioning and leveling of a saw blade.

SUMMARY OF THE INVENTION

According to the present invention there is provided an apparatus for producing a harder and more level saw blade that has a planar tolerance down to 0.002 inches, and for providing increased tolerance using a less expensive machine than conventional rim tensioning machines. Instead of the wheels of the prior art, the present invention uses bearings, preferably spherical rollers, attached to pivotally mounted movable arms. The rollers are radially offset from each other along the same radius of a saw blade on opposing faces of the blade. The rollers generally have a diameter of between approximately ½ inch to about 3 inches. The preferred rollers have a diameter of about 1¼ inches and apply approximately 1200 pounds of point pressure to the face of the blade. In one embodiment, the rollers are spherical hardened steel with chrome plating. Any roller that is capable of bending steel could potentially be used in the present invention provided it can apply sufficient point pressure to create the desired effect.

Due to their smaller contact area on the blade, the spherical rollers create less friction and consequently generate less heat on the blade. Generally greater heat curls a blade out of plane, but the rollers of the invention generate less friction and less heat, and hence less curling than is found in the prior art.

In one embodiment, the rollers can be moved radially along the surface of the blade, which allows leveling of the blade between its center and edge. This adaptability of the invention allows for leveling and strengthening of different sizes of blades.

A method for producing the stronger and more level saw blade is also disclosed.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

DETAILED DESCRIPTION OF THE DRAWINGS

Figure 1:
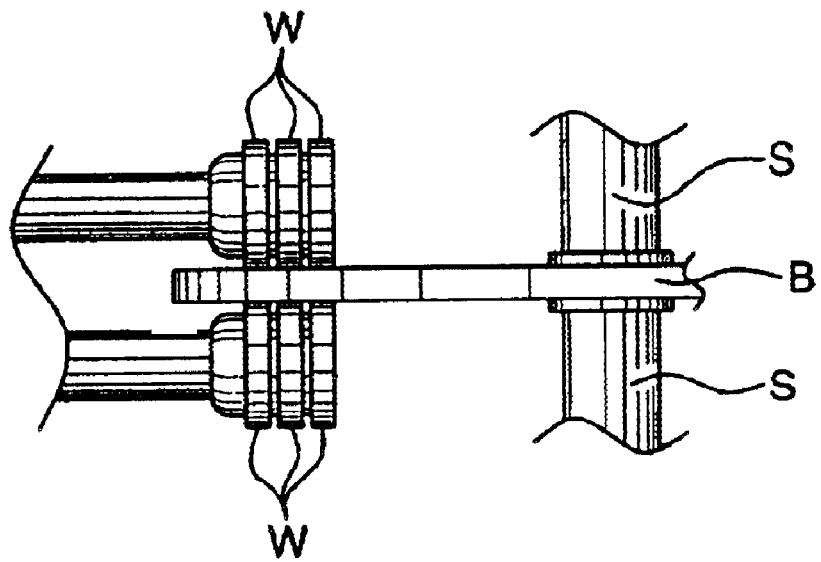
FIG. 1 is a partial side elevational view of a conventional rim tensioning system.
Figure 2:
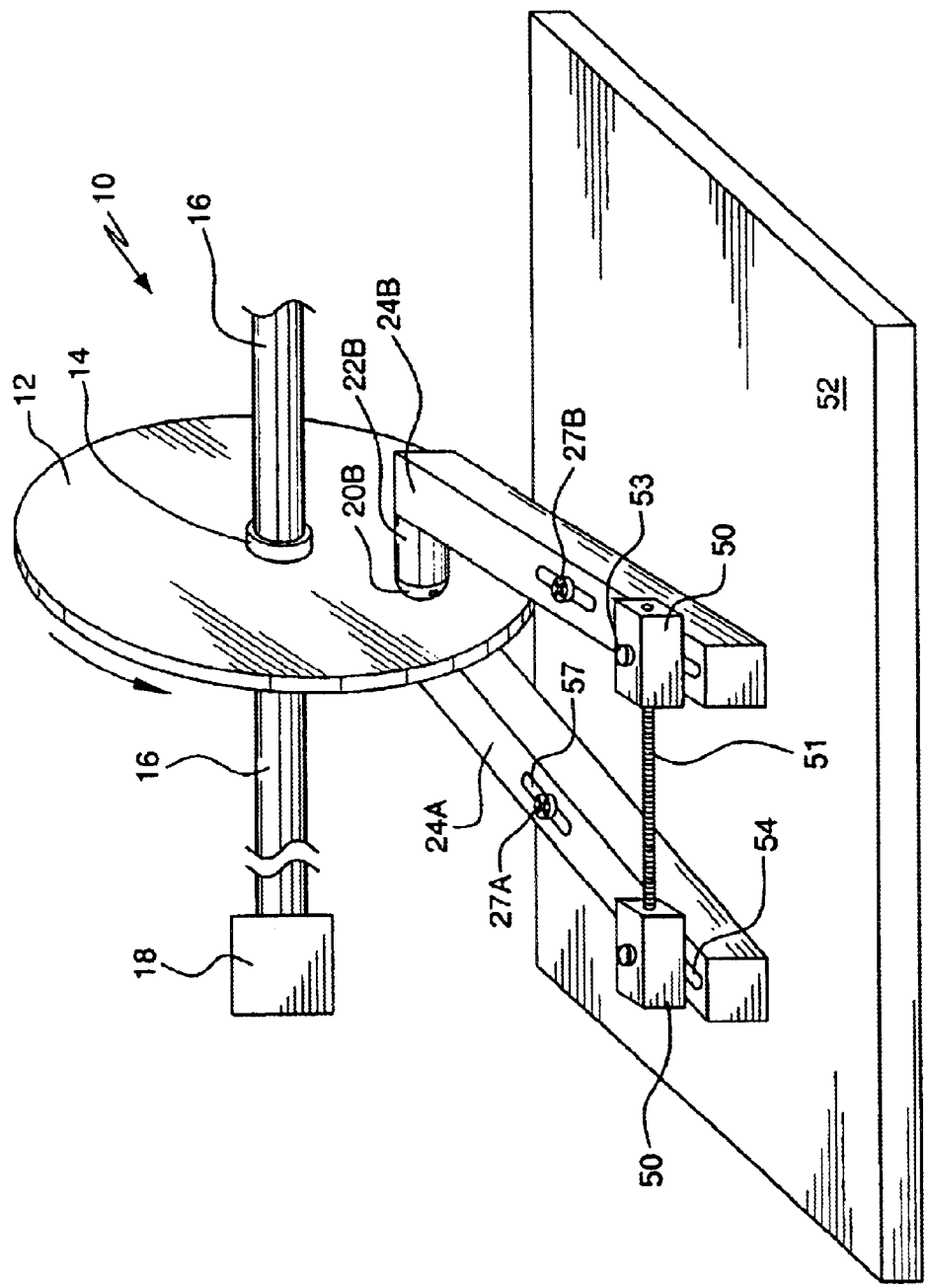
FIG. 2 is an perspective view of one embodiment of a blade leveling and strengthening apparatus according to the present invention.

Referring now to the drawings, wherein like reference numerals illustrate corresponding or similar elements throughout the several views, FIG. 2 is a perspective view of a blade leveling and strengthening apparatus 10 of the present invention. A saw blade 12 is removably mounted in a support, such as a chuck 14, which is attached to rotatable arms or shafts 16. The mounting of the blade 12 to the chuck 14 can be through any conventional means known to those skilled in the art for removably securing a saw blade to a rotatable shaft. For example, the chuck 14 could be designed to engage with the mounting hole that exists in the center of most saw blades. Alternately, the chucks 14 might simply be two cups or pressure plates that are pressed into the opposite sides of the blade to hold it straight. While two chucks 14 are described with respect to FIG. 2, it is also contemplated that a single chuck on one shaft 16 could be used to hold the blade to the shaft. It is also contemplated that the chuck 14 may be removably engaged with the shaft such that different size chucks can be used to secure different blades to the shaft 16.

The rotatable shafts 16 are engaged with and driven by a motor 18. As will be discussed in more detail below, the motor 18 drives the shafts 16 and, as a result the saw blade, preferably at a speed sufficient to provide the necessary strengthening and leveling. In most cases the speed of rotation of the shafts will be sufficiently high to provide efficient finishing of the blade, while not so high as to generate excessive heat during operation. A preferred speed would be approximately 60 to 150 RPM (although faster and slower speeds can be used depending on the blade size and material.) It should be noted that higher speeds may require the use of a coolant to minimize heating of the blade. At these speeds a conventional size blade can be surface treated in about 5 seconds. Another factor effecting tensioning and leveling the blade is the amount of pressure applied to the faces of the blade. As described above, it is desirable to have approximately 1200 pounds of pressure applied to the face of the blade. Other pressures can be used depending on the characteristics of the material of the blade. In the present invention, conventional pressure levels can be used to achieve the desired tensioning.

Figure 3:
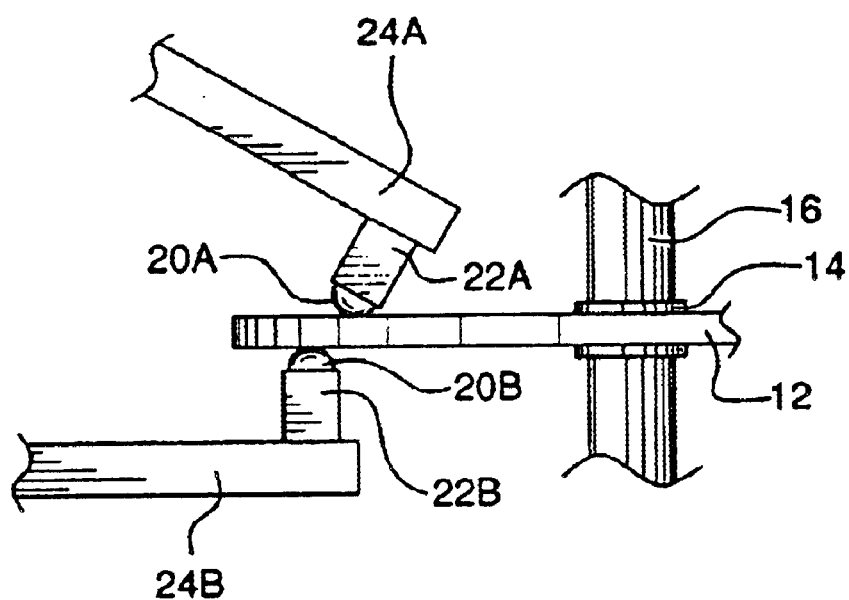
FIG. 3 is a partial side elevational view of the apparatus of FIG. 2.

The present invention includes contact surfaces 20A, 20B, such as roller bearings, which are mounted in bearing mounts 22A, 22B. The bearing mounts, in turn, are attached to or formed integral with first and second arms 24A, 24B. As shown in more detail in FIG. 3, the bearings 20A, 20B are mounted such that each bearing is in contact with an opposite face of the blade 14. The bearings 20A, 20B preferably have spherical or semispherical surfaces which are positioned to contact the faces of the blade 14. In the case of the spherical bearing 20A, 20B, the bearing preferably rotates within the bearing mount 22A, 22B. For semispherical shaped bearings 20A, 20B, the bearing is fixed to the bearing mount 22A, 22B and, since it cannot rotate, preferably has a low friction coating, such as a TEFLON coating, or is formed with a surface finish that minimizes friction (i.e., high precision finish or low friction material such as high strength plastic). (TEFLON is a registered trademark of E. I. Du Pont de Nemours and Company for polytetrafluoroethylene coatings.) Any suitable material can be used provided the material is harder than the material of the blade. The size of the bearing will vary depending on the size of the blade being tensioned and leveled. Preferably the contact bearing has a diameter of between approximately ½ inch to about 3 inches. The preferred rollers have a diameter of about 1¼ inches.

As shown in the figures, the bearings 20A, 20B are operably located to come into contact with the opposite faces of the blade 14. The positioning of the bearings 20A, 20B is controlled by the first and second arms 24A, 24B. The arms 24A, 24B are controlled to result in the point of contact of the bearings 20A, 20B being either radially and circumferentially aligned or slightly offset on the face of the blade. For example, the position of the bearings are controlled to be circumferentially aligned but radially offset; radially aligned but circumferentially offset; radially and circumferentially aligned or offset.

Figure 4:
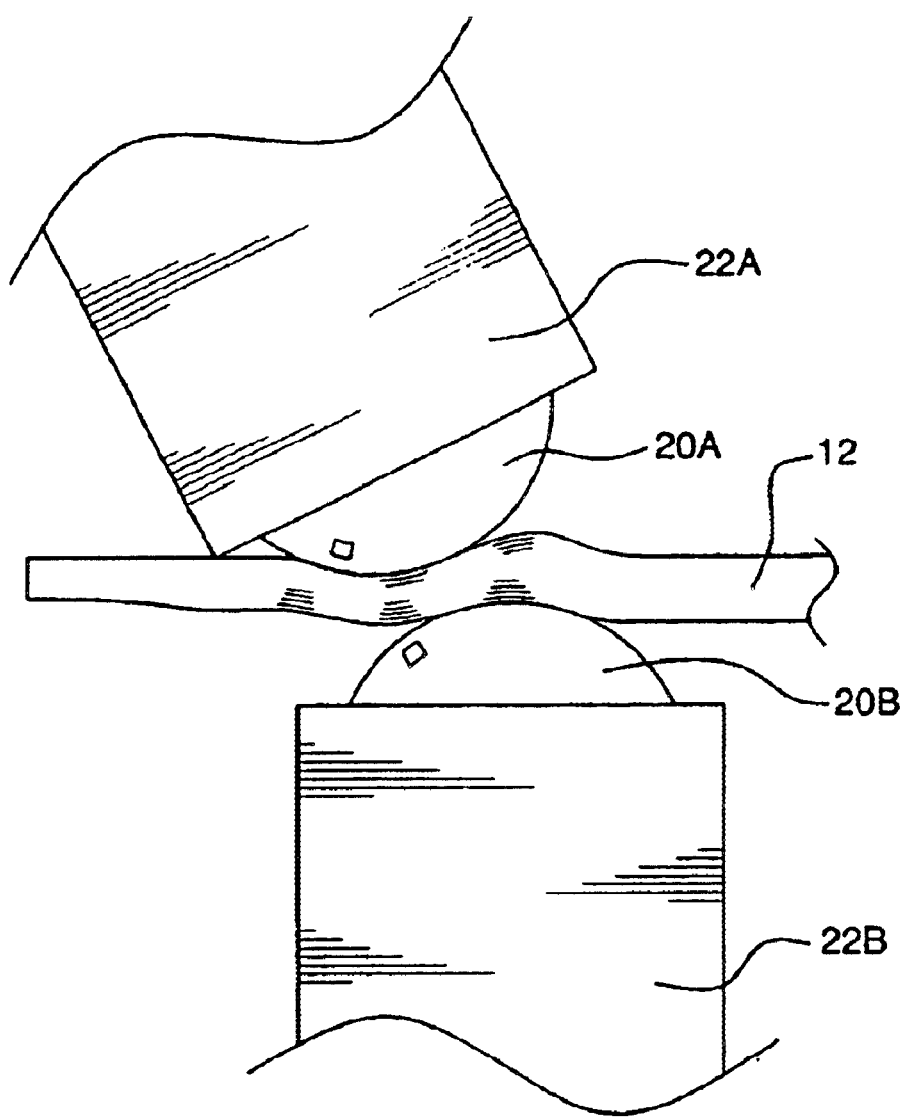
FIG. 4 is an enlarged view of a portion of the apparatus of FIG. 2 illustrating the plastically deformed blade during the operation of the apparatus of the present invention.

Referring to FIG. 4, the positioning of the bearings is shown to exemplify one embodiment of the invention. As shown, the location of the bearings 20A, 20B on the opposite faces of the saw blade is such that their point of contact with the blade 14 is preferably either radially or circumferentially offset. The result is localized deformation of the blade 14. (For purposes of illustration, the deformation is shown greatly exaggerated in FIG. 4.) As will be discussed in more detail below, the deformation of the blade produces two effects. First, the spacing of the bearings 20A, 20B is precisely controlled to result in the contacted area of the blade having a substantially true thickness (i.e., substantially no out of plane deformation.) Second, the deformation of the material results in localized hardening of the contacted area. This provides tensioning of the blade.

In one aspect of the invention, the bearings 20A, 20B are first preferably positioned so as to be radially offset but circumferentially aligned. As the blade 14 is rotated, the blade material between the spherical surfaces of the bearings 20A, 20B is deformed by the point contact of the bearings 20. After at least one complete rotation, the bearings 20A, 20B are repositioned by adjusting the first and second arms 24A, 24B such that the radial offset of the bearings 20A, 20B is reversed. That is the bearing that was radially inward during the first revolution of the blade is repositioned so as to be radially outward. This is best illustrated with reference to FIG. 4. If the first pass is shown in that figure with the upper bearing 20A being positioned radially outward from the lower bearing 20B, then in the second pass the spacing between the bearings will be the same, but lower bearing 20B would be radially outward from the upper bearing 20A. On successive passes, the bearing locations will be switched and the radial distance between them shortened until the distance between the bearings is negligible. This can also be done in the circumferential direction. In the preferred embodiment of the invention, the offset starts at about ½ inches between roller bearing centers. The distance between the two is reduced by 50% after each cycle. It is contemplated, however, that the offset will vary depending on the size of the blade being finished.

In addition to leveling the blade, the pressurization assists in reducing residual stress in the blade. Also, the present invention can be used to incorporate localized plastic deformation into the face of the blade. For example, after leveling, additional pressure can be applied at specific locations to induce cold deformation of the material. This might be an etched line at a radial location on the blade. The plastic deformation produces an intermediate hard spot which changes the vibrational and acoustical characteristics of the blade. The location of the hard spot can also be used to prevent catastrophic failure of the blade, such as by cracking. In one embodiment, the etched line is located as close to the edge of the blade as possible (taking into account the expansion slots). The present invention provides the capability of creating an unlimited number of hard spots on the blade. The ability to change the acoustical signature of the blade has tremendous benefits in reducing workplace noise.

The position of the bearings on the apparatus are adjusted as follows. Referring to FIG. 2, the arms 24A, 24B are rotated about first and second pivot screws 27A, 27B, respectively. Other types of conventional pivot mounts can be used, such as pins. The pivot screws extend through fulcrum slot 57 into a base or mounting block 52. The slot permits the arms to be translated axially, thus permitting adjustment of the radial position of the bearings 20 on the saw blade. When the proper location is achieved, the pivot screws are tightened to prevent or limit movement. Other types of locking mechanisms can be used to secure the arms in place. Also, instead of sliding in slots, the arms could, instead, be mounted to linear actuators which can translate the arms toward and away from the blade. Alternately, a linkage arrangement can be used if desired. Instead of the arms axially translating via slots, it is also contemplated that the arms can be mounted to slidable supports which can be controlled through linear actuators to move in a desired direction along the plane of the base.

Arms 24A, 24B are rotated about the pivot screw by adjusting a tensioning screw or rod 51 which is attached at or near the radially outer ends of the arms. Alternately, a pneumatic piston (not shown) may used in place of the tensioning screw. The ends of the tensioning screw 51 are threadingly engaged with separator blocks 50. The blocks 50 are preferably attached to the base 52 by a pins or screws 53 so as to permit rotation of the separator blocks 50 which allows the tensioning screw 51 or pneumatic piston to remain normal to the mounting block. Slots 54 may be formed in the arms to receive the screws 53.

Figure 5:
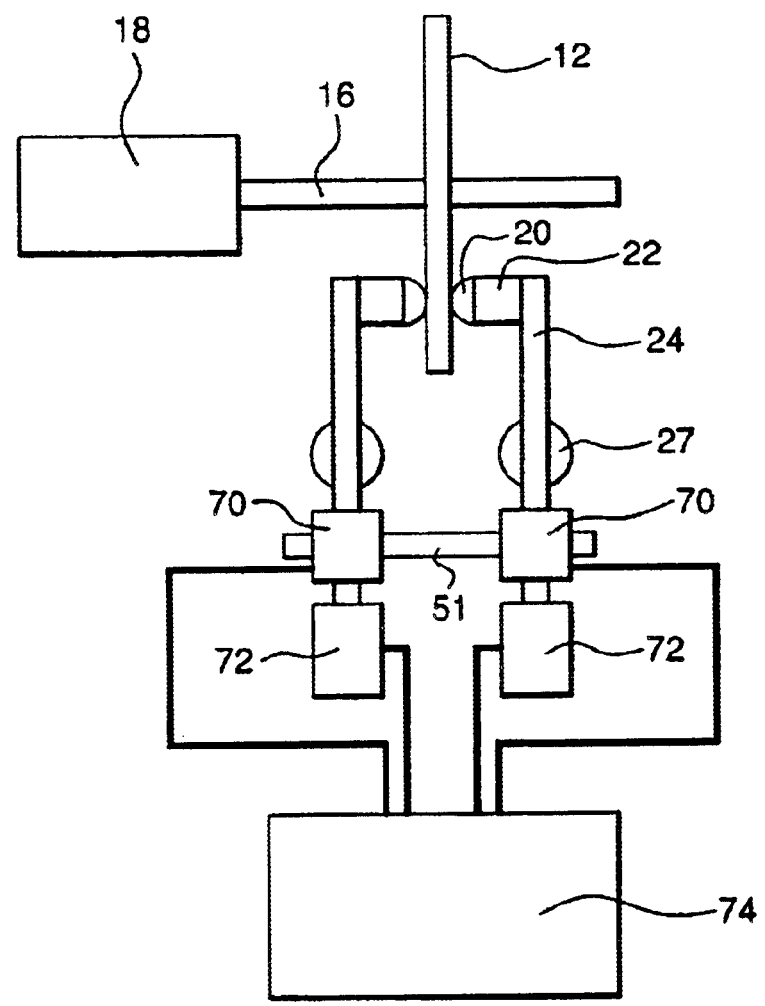
FIG. 5 is a schematic plan view of an arrangement of the invention which incorporates computer controlled actuators for controlling the tensioning and leveling.

Other mechanisms can be used to control the axial translation and rotation of each arm. For example, referring to FIG. 5, the arms can be independently controlled using computer controlled actuators 70, 72. A computer 74 is programmed so as to properly position and reposition the arms 24 and bearings 20 during operation. Sensors, such as rotary position sensors (not shown), can be used to track the position of the saw blade during the tensioning process. After the saw blade has rotated the necessary amount of times, the computer would automatically reposition the bearings 20. Also, while the above discussion referred to the bearings changing position after a complete revolution, it is also contemplated that the bearings can be positioned and controlled to spiral along the faces of the saw blade. Thus, once positioned relative to one another, the bearings can be moved in combination in a radial direction so as to provide a continuous tensioning of the blade from the tip to the center of the blade. This can be performed as an alternate for or in addition to the types of tensioning described above.

It should be recognized by those of skill in the art that more than two bearings may be used in the present invention if desired. Other variations to the invention may also be employed and would be apparent to those skilled in the art in light of the above discussion. Hence, although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. An apparatus for leveling and strengthening a rim of a saw blade comprising:

a rotatable support for holding a saw blade;

a first arm having a first contact bearing mounted within a bearing mount and adapted to contact a first face of the saw blade when the saw blade is mounted to the support, the first arm being pivotally mounted to a base at a first pivotal mount which permits the first arm to rotate about a first pivot point;

a second arm having a second contact bearing mounted within a bearing mount and adapted to contact a second face of the saw blade when the saw blade is mounted to the support, the second arm being pivotally mounted to the base at a second pivotal mount which permits the second arm to rotate about a second pivot point; and means for positioning the first and second contact bearings with respect to the saw blade support, wherein the means for positioning the first and second bearings with respect to the support includes a slot formed in each of the first and second arms, the first and second pivotal mounts each extending through the slot such that the slot operates to guide the arm relative to the pivotal mount.

2. The apparatus of claim 1, wherein the first and second pivotal mounts each is a screw which can be tightened to inhibit relative axial movement between the pivotal mount and the arm.

3. An apparatus for leveling and strengthening a rim of a saw blade comprising:

a rotatable support for holding a saw blade;

a first arm having a first contact bearing mounted within a bearing mount and adapted to contact a first face of the saw blade when the saw blade is mounted to the support, the first arm being pivotally mounted to a base at a first pivotal mount which permits the first arm to rotate about a first pivot point;

a second arm having a second contact bearing mounted within a bearing mount and adapted to contact a second face of the saw blade when the saw blade is mounted to the support, the second arm being pivotally mounted to the base at a second pivotal mount which permits the second arm to rotate about a second pivot point; and means for positioning the first and second contact bearings with respect to the saw blade support, wherein the means for positioning the first and second includes a lateral adjustment mechanism attached to the first and second arms at locations spaced apart from the first and second pivotal mounts, the adjustment mechanism adapted to vary the lateral spacing with respect to one another of the ends of the arms.

4. The apparatus of claim 3 wherein the lateral adjustment mechanism includes a first separator block mounted on the first arm, a second separator block mounted on the second arm, and a tension rod threaded into the first and second separator blocks, rotation of the tension rod producing variation in the lateral spacing between first and second ends of the arms, the change in the lateral spacing producing rotation of the arms about the first and second pivotal mounts.

5. The apparatus of claim 4 wherein the separator blocks are pivotally mounted to the arms by pivot mounts.

6. The apparatus of claim 5 wherein the pivot mounts for the separator blocks are pivot members which are located within slots formed in the arms.

7. The apparatus of claim 3 wherein the lateral adjustment mechanism includes a first separator block mounted on the first arm, a second separator block mounted on the second arm, and a pneumatic cylinder that engages the first and second separator blocks, wherein actuation of the pneumatic cylinder varies lateral spacing between the first and second ends of the arms, the change in the lateral spacing producing rotation of the arms about the first and second pivotal mounts.

8. The apparatus of claim 7 wherein the separator blocks are pivotally mounted to the arms by pivot mounts.

9. The apparatus of claim 8 wherein the pivot mounts for the separator blocks are pivot members which are located within slots formed in the arms.

10. The apparatus of claim 3 wherein the first and second contact bearings are spherical in shape, the bearing mounts permit the bearings to roll and the bearings have a diameter of between approximately ½ inch and approximately 3 inches.

11. The apparatus of claim 10 wherein the bearings have a diameter of approximately 1.25 inches.

12. The apparatus of claim 3 wherein the first and second contact bearings are spherical in shape, the bearing mounts permit the bearings to roll and the bearings are made from chrome plated hardened steel.

13. A method for leveling and strengthening a rim of a saw blade comprising the steps of:

providing a first arm with a first contact surface on a first end;

providing a second arm with a second contact surface on a first end, the second contact surface facing the first contact surface;

mounting a saw blade to a support;

locating the saw blade between the contact surfaces on the first and second arms;

positioning the first contact surface against one face of the saw blade;

positioning the second contact surface against the opposite face of the saw blade;

rotating the saw blade while the contact surfaces are pressed against the faces of the saw blade; and controlling the movement of the first and second arms for repositioning the contact surfaces on the faces of the saw blade while the saw blade is rotating, wherein the step of positioning the first contact surface involves locating the first contact surface at a selected position on the face of the saw blade, and wherein the step of positioning the second contact surface involves locating the second contact surface at a selected position on the opposite face of the saw blade, the position of the second contact surface being offset from the position of the first contact surface.

14. The method of claim 13 wherein the step of controlling the movement of the first and second arms involves moving at least one of the arms so the amount of offset between the contact surfaces is varied.

15. The method of claim 14 wherein the step of moving at least one of the arms results in the amount of offset being a difference in the radial position with respect to the saw blade of at least one of the arms.

16. The method of claim 13 wherein the amount that the contact surfaces are offset is initially equal to or less than about ½ inch.

17. The method of claim 16 wherein the amount of offset is reduced by about ½ after a predetermined amount of operation.

18. The method of claim 13 wherein the step of rotating the saw blade involves rotating the blade at between approximately 60 RPM and approximately 150 RPM.

19. The method of claim 13 wherein the steps of positioning the first and second contact surfaces results in a point pressure on the saw blade of approximately 1200 psi.

20. The method of claim 13 wherein the steps of controlling the movement of the first and second arms is continued until the saw blade is approximately level.

21. The method of claim 20 wherein after the saw blade is approximately level, the method comprises the steps of repositioning the first and second contact surfaces so that there is substantially no offset, and applying a predetermined amount of pressure to the saw blade while rotating to produce localized plastic deformation.

22. The method of claim 21 wherein the repositioning of the first and second contact surfaces is such that the localized plastic deformation is located radially near the edge of the saw blade.

* * * * *